United States Patent
Jain et al.

(10) Patent No.: US 9,936,438 B2
(45) Date of Patent: *Apr. 3, 2018

(54) SYSTEM AND METHOD FOR HANDLING STRAY SESSION REQUESTS IN A NETWORK ENVIRONMENT

(71) Applicant: CISCO TECHNOLOGY, INC., San Jose, CA (US)

(72) Inventors: Paras Jain, Bangalore (IN); Vimal Srivastava, Bangalore (IN); Chitresh Yadav, Bangalore (IN); Ravi K. Guntupalli, Cumming, GA (US)

(73) Assignee: Cisco Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,161

(22) Filed: Jul. 5, 2016

(65) Prior Publication Data
US 2016/0345237 A1    Nov. 24, 2016

Related U.S. Application Data

(63) Continuation of application No. 14/463,500, filed on Aug. 19, 2014, now Pat. No. 9,420,607.
(Continued)

(51) Int. Cl.
*H04B 7/00* (2006.01)
*H04W 40/24* (2009.01)
(Continued)

(52) U.S. Cl.
CPC ......... *H04W 40/248* (2013.01); *H04L 45/745* (2013.01); *H04L 61/203* (2013.01);
(Continued)

(58) Field of Classification Search
USPC .............................. 455/509, 515, 516, 435.1
See application file for complete search history.

(56) References Cited

U.S. PATENT DOCUMENTS 7,613,822 B2    11/2009  Joy et al.
8,200,830 B2     6/2012  Ramankutty et al.
(Continued)

FOREIGN PATENT DOCUMENTS

| CN | 103004284 A | 3/2013 |
|---|---|---|
| EP | 1953991 | 8/2008 |
| EP | 2950509 | 12/2015 |

OTHER PUBLICATIONS

"ETSI TS 123 401 V.9.5.0 (Jun. 2010) Technical Specification: LTE; General Packet Radio Service (GPRS) Enhancements for Evolved Universal Terrestrial Radio Access Network (E-UTRAN) Access; (3GPP TS.23401 version 9.5.0 Release 9);" European Telecommunications Standards Institute 2010, F-06921 Sophia Antipolis Cedex France; Jun. 2010; [See §4 pp. 15-46 and §5.10 pp. 185-191].

(Continued)

*Primary Examiner* — Fayyaz Alam
(74) *Attorney, Agent, or Firm* — Patterson + Sheridan, LLP

(57) ABSTRACT

An example method is provided in one example embodiment and may include receiving a session request for a user equipment (UE) at a node, wherein the session request includes a timestamp for the UE and a retry count; determining if the session request is a stray session request; and maintaining session information for an existing session for the UE at the node if the session request is a stray session request. The method can include identifying the received session request as a stray request if the timestamp received in the request is less than a timestamp stored for an existing session for the UE. The method can also include identifying (Continued)

the received request as a stray request if the timestamp received is equal to the timestamp stored for the existing session and if the retry count received is less than or equal to a retry count stored for the session.

20 Claims, 10 Drawing Sheets

Related U.S. Application Data

(60) Provisional application No. 62/004,060, filed on May 28, 2014.

(51) Int. Cl.
| | | |
|---|---|---|
| *H04L 29/08* | (2006.01) | |
| *H04L 29/06* | (2006.01) | |
| *H04W 76/02* | (2009.01) | |
| *H04W 74/00* | (2009.01) | |
| *H04L 12/741* | (2013.01) | |
| *H04L 29/12* | (2006.01) | |
| *H04W 4/02* | (2018.01) | |
| *H04W 8/04* | (2009.01) | |
| *H04W 72/04* | (2009.01) | |
| *H04W 80/10* | (2009.01) | |
| *H04W 88/02* | (2009.01) | |
| *H04W 88/08* | (2009.01) | |
| *H04W 88/16* | (2009.01) | |

(52) U.S. Cl.
CPC ............ *H04L 67/14* (2013.01); *H04L 69/28* (2013.01); *H04W 4/025* (2013.01); *H04W 8/04* (2013.01); *H04W 72/0493* (2013.01); *H04W 74/004* (2013.01); *H04W 76/027* (2013.01); *H04W 80/10* (2013.01); *H04W 88/02* (2013.01); *H04W 88/08* (2013.01); *H04W 88/16* (2013.01)

(56) References Cited

U.S. PATENT DOCUMENTS

| | | | |
|---|---|---|---|
| 9,420,607 B1 | 8/2016 | Jain et al. | |
| 2010/0046434 A1* | 2/2010 | Weniger | H04W 8/06 370/328 |
| 2011/0270995 A1* | 11/2011 | Mutikainen | H04L 29/12584 709/227 |
| 2012/0258712 A1* | 10/2012 | Rozinov | H04L 61/1535 455/435.1 |
| 2012/0281536 A1 | 11/2012 | Gell et al. | |
| 2013/0016636 A1* | 1/2013 | Berger | H04W 60/00 370/310 |
| 2013/0279406 A1 | 10/2013 | Merino Vasquez et al. | |
| 2014/0153577 A1 | 6/2014 | Janakiraman et al. | |

OTHER PUBLICATIONS

"ETSI TS 129274 V.9.5.0 (Jan. 2011) Technical Specification: Universal Mobile Telecommunications Systems *UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.5.0 Release 9);" European Telecommunications Standards Institute 2011, F-06921 Sophia Antipolis Cedex France; Jan. 2011; [See §8 pp. 115-163].

EPO Oct. 6, 2015 Extended Search Report and Written Opinion from European Application Serial No. EP15169506.

3GPP TS 23.401 V12.4.0 (Mar. 2014) Technical Specification: $3^{rd}$ Generation Partnership Project; Technical Specification Group Services and System Aspects; General Packet Radio Service (GPRS) enhancements for Evolved Universal terrestrial Radio Access Network 9E-UTRAN) access (Release 12), $3^{rd}$ Generation Partnership Project, 650 Route des Lucioles—Sophia Antipolis, Valbonne France; Mar. 2014; 302 pages.

ZTE: "ULI in the Create Session Request," 3GPP Draft: C4-112511, 3GPP TSG CT WG4 Meeting #54bis, Hyderabad, India, Oct. 10-14, 2011, 9 pages.

* cited by examiner

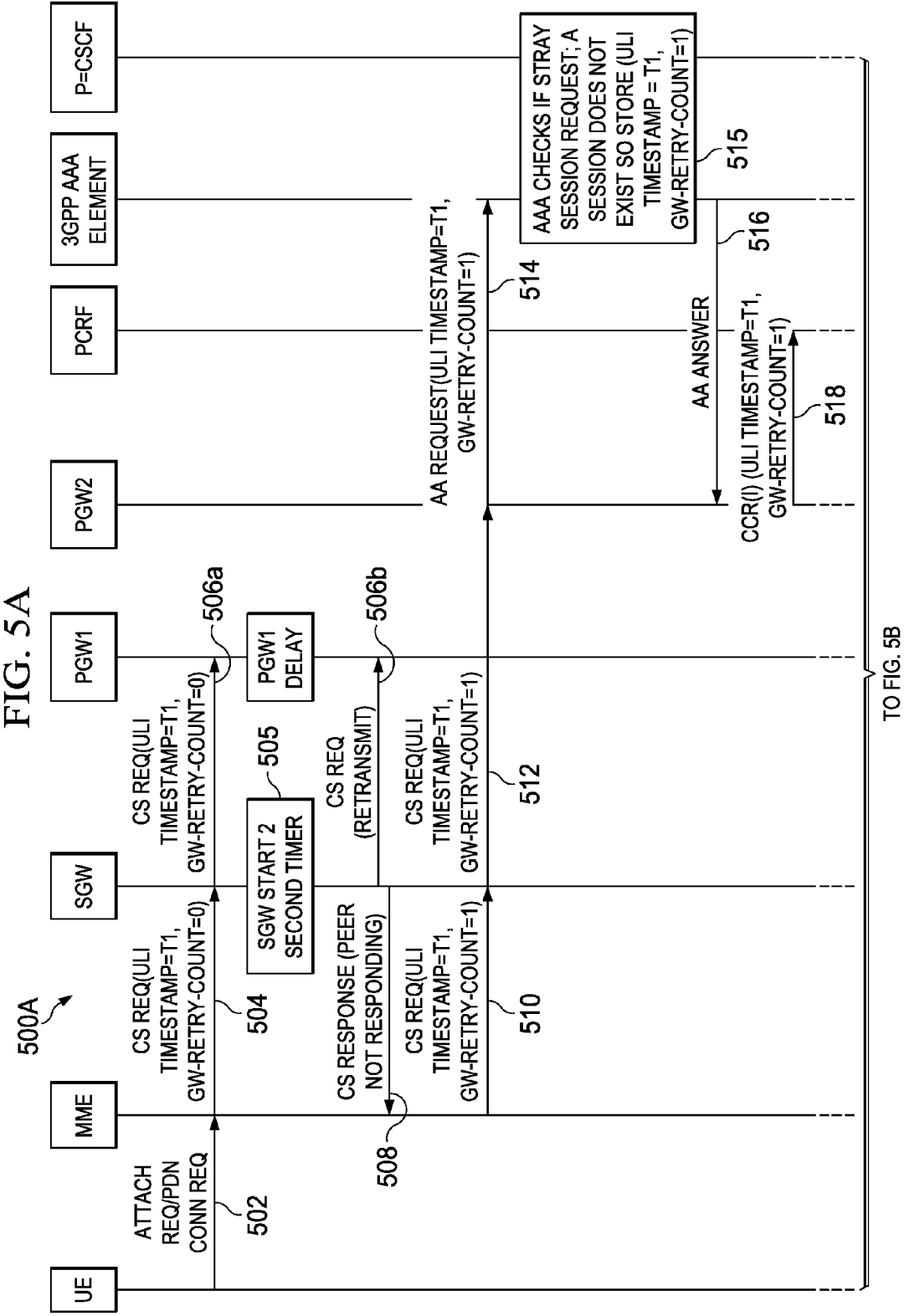

SYSTEM AND METHOD FOR HANDLING STRAY SESSION REQUESTS IN A NETWORK ENVIRONMENT

CROSS-REFERENCE TO RELATED APPLICATION

This application claims the benefit of priority under 35 U.S.C. § 119(e) to U.S. Provisional Application Ser. No. 62/004,060 entitled "SYSTEM AND METHOD FOR HANDLING STRAY SESSION REQUESTS IN A NETWORK ENVIRONMENT" filed May 28, 2014. This application is a continuation (and claims the benefit of priority under 35 U.S.C. § 120) of U.S. application Ser. No. 14/463,500, filed on Aug. 19, 2014, entitled "SYSTEM AND METHOD FOR HANDLING STRAY SESSION REQUESTS IN A NETWORK ENVIRONMENT," inventors Paras Jain, et al. The disclosure of the prior applications are considered part of (and are incorporated by reference in) the disclosure of this application.

TECHNICAL FIELD

This disclosure relates in general to the field of communications and, more particularly, to a system and method for handling stray session requests in a network environment.

BACKGROUND

Networking architectures have grown increasingly complex in communications environments, particularly mobile wireless environments. Data traffic has grown extensively in recent years, which has significantly increased the demands on network resources. As the number of mobile subscribers increases, efficient management of communication resources becomes even more critical. In some instances, stray session requests for a user can occur due to delays in a node in a network or within the network itself. The stray session can cause valid session information for the user to be improperly overwritten or improperly handled within the network. Accordingly, there are significant challenges in handling stray session requests for users within the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5C are simplified flow diagrams illustrating potential flows and activities associated with handling stray session requests in accordance with one potential embodiment of the communication system.

DETAILED DESCRIPTION OF EXAMPLE EMBODIMENTS

Overview

A method is provided in one example embodiment and may include receiving a session request for a user equipment (UE) at a node, wherein the session request includes a timestamp for the UE and a retry count; determining if the session request is a stray session request; and maintaining session information for an existing session for the UE at the node if the session request is a stray session request. In some instances, the session request can be an Internet protocol connectivity access network (IP-CAN) create session request. In some instances, the node can be at least one of: a Policy and Charging Rules Function (PCRF); and an Authentication, Authorization and Accounting (AAA) element. In still other instances, the timestamp can be a User Location Information (ULI) timestamp.

In some cases, the method can include determining if a current session exists for the UE; and storing the timestamp and retry count received for the UE if a session does not exist for the UE. In some instances, the determining if the received session request is a stray session request can further include: comparing a timestamp stored for the existing session for the UE to the timestamp received in the session request; and identifying the received session request as a stray request if the timestamp received in the session request is less than the timestamp stored for the existing session for the UE.

In still other instances, the determining if the received session request is a stray session request can further include: comparing a retry count stored for the existing session for the UE to the retry count received in the session request if the timestamp received in the session request is equal to the timestamp stored for the existing session for the UE; and identifying the received session request as a stray session request if the retry count received in the session request is less than or equal to the retry count stored for the existing session for the UE.

In still other cases, the method can include appending, by a first Mobility Management Entity (MME), a create session request communicated to a first packet data network gateway (PGW), with the timestamp for the UE and the retry count. In some instances, the first MME can increment the retry count each time the first MME re-sends a create session request to another PGW different from the first PGW unless the UE has transitioned to the first MME from another MME.

Example Embodiments

Figure 1:
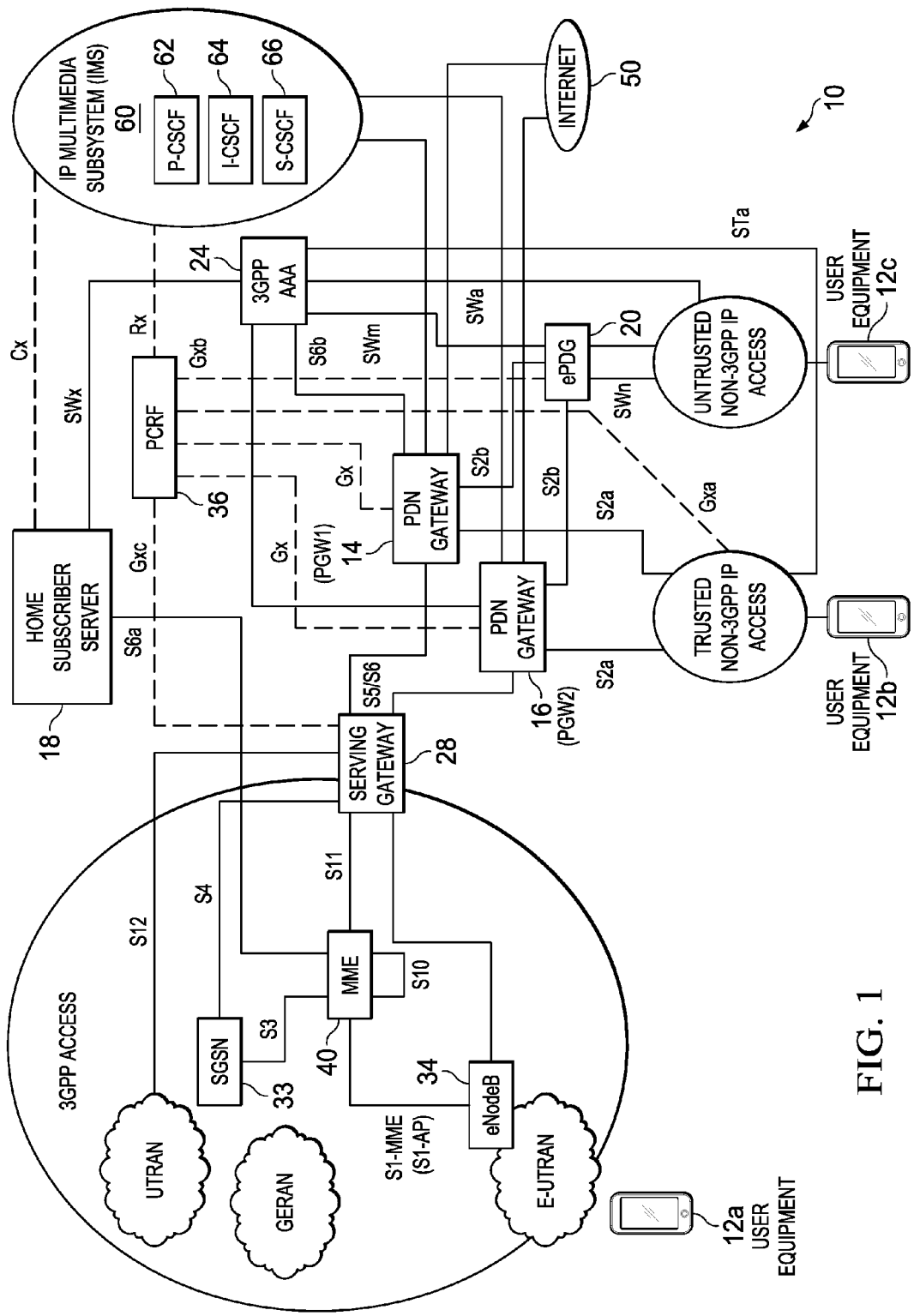
FIG. 1 is a simplified block diagram illustrating a communication system to facilitate handling stray session requests in a network environment according to one embodiment of the present disclosure.

Turning to FIG. 1, FIG. 1 is a simplified block diagram illustrating a communication system 10 to facilitate handling stray session requests in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users operating user equipment (UE) 12a-12c and packet data network (PDN) gateways (PGWs) 14, 16, each of which have a logical connection to a serving gateway (SGW) 28. [Note, for purposes of explanation only, PGW 14 may be referred to herein in this Specification as PGW1 and PGW 16 may be referred to as PGW2.] Also provided are a home subscriber server (HSS) 18, a 3GPP Authentication, Authorization and Accounting (AAA) element 24 and a serving gateway support node (SGSN) 33. SGW 28 also has a logical connection to an eNodeB 34, a Mobility Management Entity (MME) 40 and to SGSN 33. SGW 28 and PGWs 14, 16 can interface with a Policy and Charging Rules Function (PCRF) 36. As used herein in this Specification, the terms 'user equipment,' 'user' and 'subscriber' are interchangeable.

PGWs 14, 16 may provide IP connectivity access network (IP-CAN) session connectivity for UEs to external packet data networks (PDNs), such as, for example an IP multimedia subsystem (IMS) 60 and/or an internet 50. IMS 60 may provide, among other things, voice over LTE (VoLTE) capabilities for UE 12a-c via one or more call session control functions (CSCFs), which may be referred to collectively as Session Initiation Protocol (SIP) servers. Various CSCFs may interface with PCRF 36 via one or more DIAMETER-based Rx interface(s) and/or HSS via one or more DIAMETER-based Cx interfaces. IMS 60 may include a proxy CSCF (P-CSCF) 62, an interrogating CSCF (I-CSCF) 64 and a serving CSCF (S-CSCF) 66. For a VoLTE call, P-CSCF 62 may serve as an entry node into the IMS 60 and may serve as a proxy server for a given UE attempting to establish a VoLTE call via IMS 60. I-CSCF 64 may operate to locate a given S-CSCF 66 (e.g., multiple S-CSCFs may be present in IMS 60) for the UE. Once an appropriate S-CSCF is located, I-CSCF 64 may remove itself from the signaling path of the UE and SIP registration/call handling may continue for the UE via P-CSCF 62 and S-CSCF 66.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in Technical Specification (TS) 23.401, TS 29.274, etc. The EPS generally consists of UE access networks and an Evolved Packet Core (EPC). Access networks may be 3GPP access networks including legacy access networks such as GSM EDGE Radio Access Network (GERAN), UMTS Terrestrial Radio Access Network (UTRAN), generally referred to as 3G, and/or LTE access networks such as Evolved UTRAN (E-UTRAN), generally referred to as 4G/LTE/LTE-Advanced (LTE-A), or they may be non-3GPP IP access networks such as digital subscriber line (DSL), Cable, WiMAX, code division multiplex access (CDMA) 2000, WiFi, or the Internet.

Non-3GPP IP access networks can be divided into trusted and untrusted segments. For the trusted segment, a viable relationship exists between a service provider and the core network. Trusted IP access networks support mobility, policy and AAA interfaces to the EPC, whereas untrusted networks do not. Instead, access from untrusted access networks is done via an evolved packet data gateway (ePDG) 20, which provides for IPsec security associations to the user equipment over the untrusted IP access network. As shown in FIG. 1, ePDG 20 may have a logical connection to PCRF 36 and supports mobility, policy and AAA interfaces to the EPC, similar to the trusted IP access networks.

Also provided in the architecture of FIG. 1 are a series of interfaces, which can offer mobility, policy control, AAA functions and/or charging activities (offline and online) for various network elements. For example, interfaces can be used to exchange point of attachment, location, and/or access data for one or more end users, for example, users operating UE 12a-12c. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER protocol, service gateway interface (SGI), terminal access controller access-control system (TACACS), TACACS+, etc.

As shown in FIG. 1, a DIAMETER-based interface, Rx, may be maintained between IMS 60 (e.g., one or more of the CSCF servers included therein) and PCRF 36 for communicating information between IMS 60 and PCRF 36. PCRF 36 may provision policy charging and control (PCC) rules for PGWs 14, 16 using a DIAMETER-based Gx interface. Communication system 10 may be configured with additional DIAMETER-based interfaces to manage policy and control between various elements of the system 10. For example, DIAMETER interfaces, Gxa, Gxb and Gxc, may be maintained between the PCRF 36 and the trusted/non-trusted IP access points, the ePDG 20, and the SGW 28, respectively. Further DIAMETER interfaces, SWx, STa, SWa and SWm may be maintained between the AAA element 24 and the HSS 18, the trusted non-3GPP IP access point, the untrusted non-3GPP access point, and the ePDG 20, respectively. Various additional signaling interfaces may include S6a between HSS 18 and MME 40 and S6b between AAA element 24 and PGWs 14, 16. Other signaling interfaces are illustrated between various components of FIG. 1, according to 3GPP standards, which are not described in detail for purposes of brevity.

Before detailing further operations and infrastructure of various elements of FIG. 1, certain contextual information is provided to offer an overview of some problems that may be encountered by handling stray session requests in a network environment. Such information is offered earnestly and for teaching purposes only and, therefore, should not be construed in a way to limit the broad applications for the present disclosure. In a 3GPP network, there is a possibility of stray session creations being received and processed by network elements such as PCRF 36 and/or AAA element 24. This could be primarily due to processing delays in a node which can lead to fallback to secondary peer nodes. Such race conditions can result in correct session information being overwritten or other issues. For example, multiple IP-CAN Session requests can be sent from different PGWs (e.g., PGWs 14, 16) to PCRF 36, which can be triggered either due to PGW internal delays, backpressure queues, AAA, Subscriber Data Management (SDM) element and/or PCRF delays. Such stray requests, could lead to deletion of a valid session and/or creation of stale sessions.

In general, the recipient of any session creation request uses multiple keys to identify a session. For example, the PCRF may identify a session by an International Mobile Subscriber Identity (IMSI), a Mobile Subscriber Integrated Services Digital Network-Number (MSISDN), and/or an Access Point Name (APN). Currently when the PCRF receives an IP-CAN session initiation request from a PGW, it checks if already there is a session for the same IMSI/MSISDN/APN. If a session exists for the same IMSI/MSISDN/APN, it assumes that the existing session is a stale session and overrides the existing session with new session info. As referred to herein in this Specification, the term 'overrides' may be used interchangeably with 'overwrites'. In the context of the present disclosure, if a new session creation request received is at any node, and which is actually the latest session request (e.g., most recent in time), then an existing session at the node may be referred to as a stale session.

Consider, for example, a scenario in which the SGW may send a Create Session Request to a first PGW (e.g., PGW1) to establish a PDN connection for a given UE. While PGW1 is still processing the Create Session Request (for various reasons, e.g., system delays, etc. discussed in further detail below), the SGW may time-out due to its own timer configurations. The SGW may also notify the MME with Create Session Failure (e.g., with a Cause Code #100—Remote Peer Not Responding). The MME may reselect an alternate PGW (say, for example, PGW2) to again try to establish a PDN connection for the UE.

In the meantime, the original PGW (PGW1) may continue to process the original session creation request. In certain scenarios, PGW1 can complete its processing and forward the request to the PCRF, which can overwrite the existing Gx session on the PCRF that was created by PGW2. In this case, the existing PGW session (from PGW2) at the PCRF is the valid session and the new PGW session (from PGW1) is invalid as far as the UE, MME and SGW are concerned. The same can occur with an existing AAA session created by the AAA element based on the PGW timing lapse. This may result in the PCRF and/or the AAA element having invalid session information for the UE; while the user plane for the UE may work fine from PGW2, the Rx and Gx signaling may fail as this signaling has been terminated via PGW1 causing the PGW2 session overwrite. As referred to herein in this Specification, a request from a particular PGW for a particular UE, which may be delayed from that particular PGW while another request from another PGW for the same UE has previously completed may referred to as a 'stray' IP-CAN session request.

For VoLTE PDNs, this overwriting due to stray session requests results in call failure as the PCRF may be unable identify the correct Gx session for the UE upon receiving Rx signaling from the P-CSCF with SIP Error code cause=503 [text='Session released—service based local policy function not available'].

Current methods for stale session request handling are often implementation specific. For example, when a peer node (e.g., PCRF and/or AAA element) receives a second request about a same PDN-connection for a given UE for session creation, it assumes the existing context is stale and initiates cleanup and/or overwrites the existing context based on whether cleanup is enabled/disabled and/or based on its implementation. However, the peer node (e.g., PCRF and/or AAA element) does not have enough information to validate if the existing session is actually a stale session. As described above, there exists a possibility that a stray request can be received which, if not handled correctly, may over write a valid session.

For example, stale session handling can be performed by PCRF initiated Gx signaling or by simply overwriting the session at the PCRF by any newly received IP-CAN session request but there is currently no method to identify or distinguish stray IP-Can Session requests from genuine 'fresh' IP-CAN session requests. Thus, current methods for stale session handling are not full-proof and may result in the problems as discussed above.

Current methods for preventing stray session requests are typically limited to guard timers at PGWs; however, solutions based on guard timers at PGWs have many disadvantages. First, guard timers do not guarantee that system will behave correctly in all the scenarios (e.g., a delayed PGW may still issue a stray session request to a PCRF or AAA, which can cause problems within the system). Second, for every session establishment, a respective guard timer needs to be run which is resource intensive (e.g., central processing unit (CPU), memory, etc.). Third, guard timers may cause many race conditions and may make the overall system more complex.

In accordance with one embodiment, communication system 10 can overcome the aforementioned shortcomings (and others) by providing a solution to identify stray Session Creation requests at a peer node (e.g., AAA element 24 and/or PCRF 36) and to provide treatment of the stray session requests accordingly. Communication system 10 may provide a solution in which all the peer nodes can be provided with enough information to identify the most current session for a given UE and handle stray session requests for the UE accordingly.

Generally, the solution may provide that a message originating node (e.g., MME 40) may add a timestamp (e.g., User Location Information (ULI) timestamp) and a retry count to each create session request originating from the node. In various embodiments, the ULI timestamp may map to the 3GPP-user-location-time-value attribute value pair (AVP) in DIAMETER. The solution may also provide for defining a new data field, referred to herein in this Specification as 'GW-retry-count', which may be a new information element (IE) for the communication system.

In operation, MME 40 may include the new IE GW-retry-count and ULI-timestamp in each Create Session Request to a given PGW 14, 16 for a given UE. [Note, currently ULI timestamp is sent only in delete session requests (DSRs) delete bearer requests (DBRs)]. GW-retry-Count and the ULI-timestamp value may be sent by MME 40 to a given PGW (via SGW 28) as part of GPRS Tunneling Protocol version 2 (GTPv2) signaling. MME 40 may increase the value of GW-retry-count for every retry attempt to a new PGW to create a PDN for a given UE. Note, if the MME for a given UE has changed (e.g., UE transitioning from one MME to another MME), then the GW-retry-count value may start from zero (0). As referred to herein in this Specification, the term 'retry count' may be referred to interchangeably with the term 'GW-retry-count'.

PGWs 14, 16 (e.g., whichever one receives the create session request) may send GW-retry-count to AAA element 24 and/or PCRF 36 in a new AVP GW-retry-count and the ULI timestamp value may map to the 3GPP-user-location-time-value AVP in DIAMETER. These values can be sent to AAA element 24 during IP-CAN Session signaling on the S6b interface (e.g., via an Authorization and Authentication Request (AAR) and to PCRF 36 on the Gx interface (e.g., via a Credit Control Request-initial (CCR-I). [Note the term 'CCR-I' may be used interchangeably with the term 'CCR (I)' herein in this Specification.] AAA element 24 and/or PCRF 36 may store the value of the ULI timestamp and GW-retry-count for each IP-CAN session established for each UE. Using these two information elements and a heuristic algorithm described in further detail herein in this Specification, AAA element 24 and/or PCRF 36 can check if an existing PDN connection is stale and/or if a received IP-CAN request is a stray request.

For example, upon receiving a Create Session request for a UE, AAA element 24 and/or PCRF 36 may check, based on IMSI/MSISDN/APN for the UE, if there is already a session for the UE. If a session is already present then AAA element 24 and/or PCRF 36 may use the heuristic process, as described herein in the Specification, to identify if the received IP-CAN Session request is a stray request. If a new received request is identified as a stray request, AAA element 24 and/or PCRF 36 may, depending upon configuration settings, ignore it (e.g., drop the request) or initiate a cleanup towards a PGW from which the request was received. For cleanup, AAA element 24 and/or PCRF 36 may inform the PGW from which the request was received that the request was stray, which may cause the PGW to initiate actions such as local-cleanup (e.g., cleanup of old or invalid context information), etc. If the stray session request is just ignored, the PGW originating the stray request may continue to retry IP-CAN session requests until a timeout occurs at the PGW, which, in some cases may cause the PGW to perform a local-cleanup. However, communicating an explicit stray session request indication to the PGW that originated the stray session request can be used to initiate cleanup at the PGW and avoid any re-transmissions from the PGW. Conversely, if an existing IP-CAN session is identified as stale, AAA element 24 and/or PCRF 36 can handle it by using existing methods (e.g., overwriting the session, etc.).

The heuristic algorithm/process for determining if a create session request is stray may include, among other things comparing the timestamp received for a UE to a stored timestamp for the UE. If the timestamp received for a create session request is not greater (e.g., less than) than the timestamp stored for a UE, then the session request may be identified as stray and handled accordingly. Additionally, if the GW-retry-Count received for a create session request is less than or equal to the GW-retry-count stored for the UE, then the session request may be identified as stray and handled accordingly.

Thus, the solution provided by communication system 10 may provide a bifurcated approach for identifying and handling stray session requests within a network. Further the solution maintains simplicity of the network ecosystem; requires no dependency on any kind of timer and hence does not give rise to race conditions; avoids other problems of timer bases solutions and is critical for successful establishment of VoLTE calls.

Additionally, use of the AVPs/IEs described for the solution indicates that the ULI timestamp and GW-retry-count can be sent in existing private extension(s) and hence may work in specific customer network implementations. In various embodiments, GTPv2/DIAMETER modifications for the system can include the addition of the new IE GW-Retry-count value, as discussed above. This value can be sent in a vendor-specific private extension IE and/or in a specification-based IE as well. This new IE may be sent from an originating node and can be incremented for every retry attempt to a new node to create a session for a user, except, of course, if the user is transitioning to a particular MME from another MME. The modifications can further include the inclusion of the GW-Retry-count and ULI-timestamp IE in all Session Creation Requests. This can be made possible through the addition of the new DIAMETER AVP, 'GW-Retry-count', with the inclusion of GW-Retry-count AVP in CCR(I)s on Gx and AARs on S6b. The modifications can additionally include a new DIAMETER cause code 'STALE-SESSION-REQUEST' and a new GPRS Tunneling Protocol (GTP) failure code 'STALE-SESSION-REQUEST'.

The EPC generally comprises an MME, an SGSN, one or more SGWs, one or more PGWs and a PCRF. The components may be used to provide various UE services and/or functions and to implement Quality of Service (QoS) on packet flows. The services and functions may be used, for example, to provision enhanced services such as enhanced charging, stateful firewalls and/or traffic performance optimization (TPO). The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification; SGW and PGW selection for UE and authentication services.

The SGW is a data plane element that can manage user mobility and interfaces with RANs. The SGW also maintains data paths between eNodeBs and the PGW(s). The PGW provides IP connectivity access network (IP-CAN) session connectivity for UEs to external packet data networks (PDNs), such as, for example IMS. The SGSN may provide access for legacy universal mobile telecommunications systems (UMTS) network devices. For example, UE on the GERAN can communicate through the SGSN to the SGW or the PGW, which can include a gateway General Packet Radio Service (GPRS) support node (GGSN) to support communication with legacy systems that may include GnGp-SGSNs. Additionally, in certain examples, the PGW can perform home agent functions, and the trusted non-3GPP IP access network can provide packet data serving node (PDSN) functions in order to achieve UE mobility within the system.

Radio Access Networks (RANs) in an EPS architecture consist of eNodeBs (also known as eNBs). An eNodeB is generally connected directly to an EPC, as well as to adjacent eNodeBs. Connections with adjacent eNodeBs may allow calls to be routed more directly. An eNodeB is also responsible for selecting an MME for UE, managing radio resources, and making handover decisions for UE.

PCRF 36 may decide policy control and/or charging activities to apply to UE based on various Policy Charging and Control (PCC) rules. PCRF 36 can be configured to use user subscription information as a basis for the policy and charging control decisions. The subscription information may apply for both session-based and non-session based services. PCRF 36 may be referred to generally as a policy server. Additionally, PCRF 36 may determine PCC rules based on an application or service described to the PCRF from an application function (AF). The AF may describe applications/services to PCRF 36 that may require dynamic policy and/or charging control for one or more UE. The dynamic policy and/or charging controls may include, but not be limited to, controlling the detection for service data flows, setting charging instructions for service data flows, setting QoS levels for service data flows and/or gating.

PCRF 36 may communicate PCC rules to PGWs 14, 16. PGWs 14, 16 may serve as policy enforcement points to manage QoS, online/offline flow-based charging, data generation, deep-packet inspection and intercept.

3GPP AAA element 24 is a network element responsible for accounting, authorization and authentication functions for UE 12a-12c. For AAA considerations, AAA element 24 may provide a mobile node IP address and the accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service.

Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data. In various embodiments, communication system 10 may be provisioned with other AAA services and/or other AAA servers/elements, which may provide AAA considerations for the system.

HSS 18 offers a subscriber database in 3GPP (e.g., GSM, LTE, etc.) environments. In one sense, HSS 18 can provide functions similar to those offered by an AAA element server. When a UE moves to 3GPP access, HSS 18 can be aware of this location and the user's PDN anchor point (e.g., PGW 14 or PGW 16). HSS 18, AAA element 24 and PCRF 36 can coordinate state information for the UE (and synchronize this information) to achieve mobility within the system.

UE 12a-12c can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication system 10. UE 12a-12c may also be inclusive of a suitable interface to the human user such as a microphone, a display, a keyboard, or other terminal equipment. UE 12a-12c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12c may have a bundled subscription for network access and application services (e.g., voice), etc. Once an access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

Figure 2:
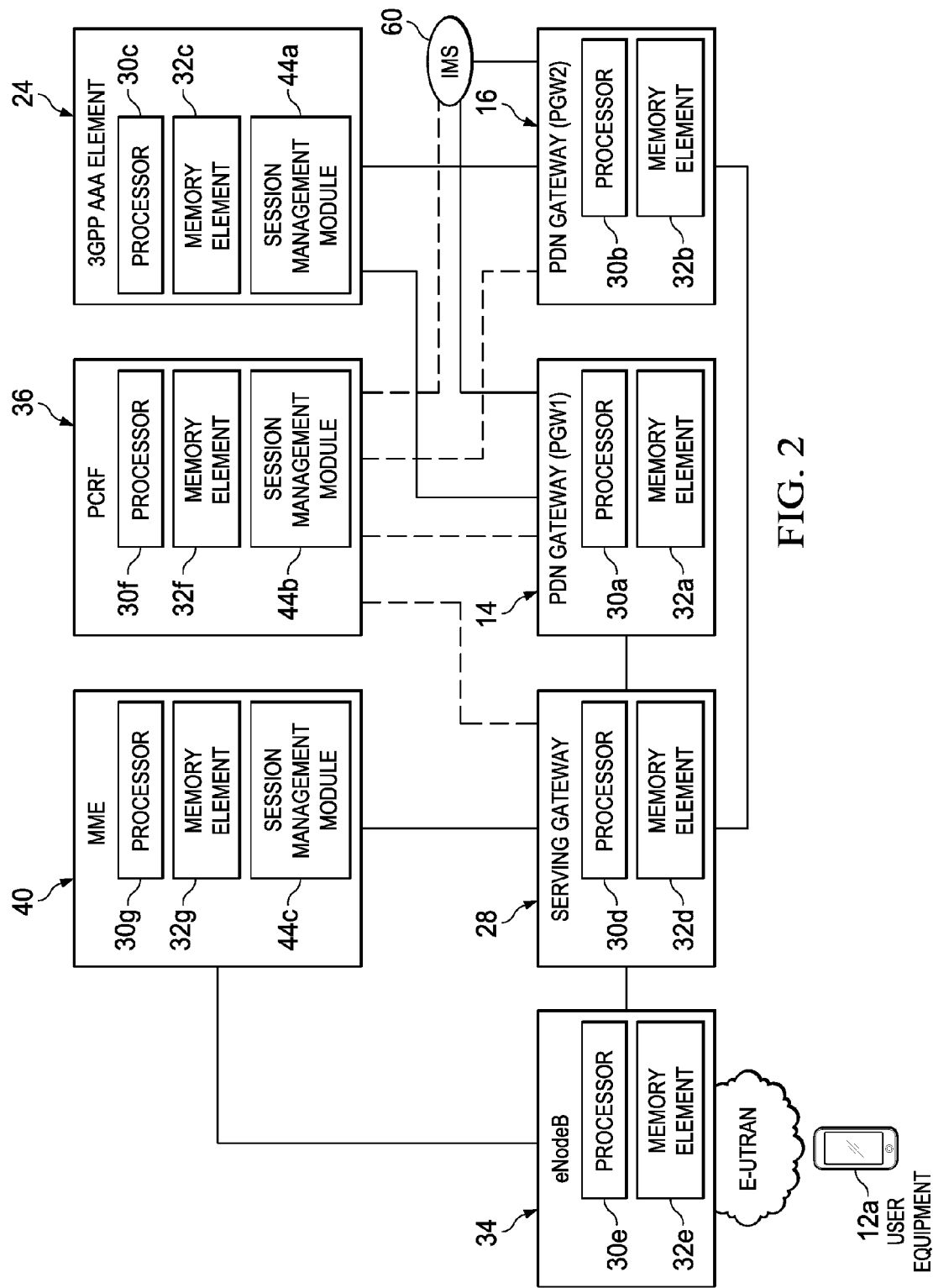
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGWs 14, 16; AAA element 24, SGW 28, eNodeB 34, PCRF 36 and MME 40 of communication system 10. Each of these elements may include a respective processor 30a-30g and a respective memory element 32a-32g. AAA element 24, PCRF 36 and MME 40 may each additionally include a respective session management module 44a-44c. In various embodiments, PGWs 14, 16 and SGW 28 may also each include a respective session management module (not shown). Hence, appropriate software and/or hardware is being provisioned in PGWs 14, 16; AAA element 24, SGW 28, eNodeB 34, PCRF 36 and MME 40 in order to facilitate providing identification and handling of stray session requests in the network environment of communication system 10. Note that in certain examples, certain databases (e.g., for storing ULI timestamp(s), GW-retry-count(s), combinations thereof or the like) can be consolidated with memory elements (or vice versa), or the storage can overlap/exist in any other suitable manner. UE 12a and IMS 60 and are also shown in FIG. 2.

In one example implementation, PGWs 14, 16, AAA element 24, SGW 28, eNodeB 34, PCRF 36 and MME 40 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide for identifying and handling of stray session requests (e.g., for networks such as those illustrated in FIGS. 1 and 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGWs 14, 16; AAA element 24, SGW 28, eNodeB 34, PCRF 36 and MME 40 can include memory elements for storing information to be used in achieving the identifying and handling of stray session requests, as outlined herein. Additionally, each of these devices may include a processor that can execute software or an algorithm to perform the identifying and handling activities for stray session requests as discussed in this Specification. These devices may further keep information in any suitable memory element [e.g., random access memory (RAM), read only memory (ROM), an erasable programmable read only memory (EPROM), an application specific integrated circuit (ASIC), etc.], software, hardware, or in any other suitable component, device, element, or object where appropriate and based on particular needs. Any of the memory items discussed herein should be construed as being encompassed within the broad term 'memory element'. In various embodiments, the information being tracked or sent to PGWs 14, 16; AAA element 24, SGW 28, eNodeB 34, PCRF 36 and MME 40 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the identification and handling activities for stray session requests as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, processors [as shown in FIG. 2] can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable programmable read only memory (EEPROM)) or an ASIC that includes digital logic, software, code, electronic instructions, or any suitable combination thereof.

Figure 3A:
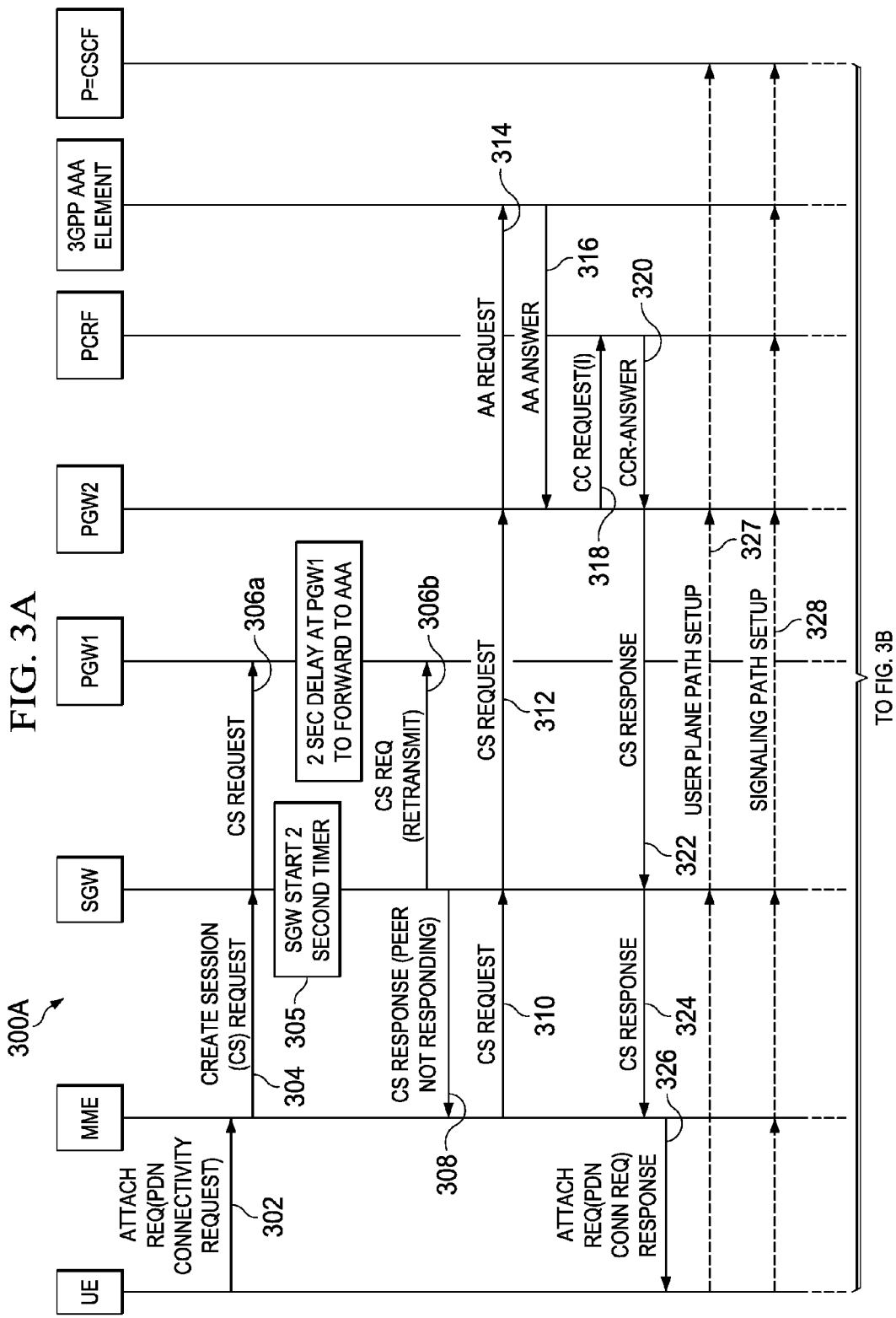
FIGS. 3A-3C are simplified flow diagrams illustrating possible example details associated with the communication system.
Figure 3B:
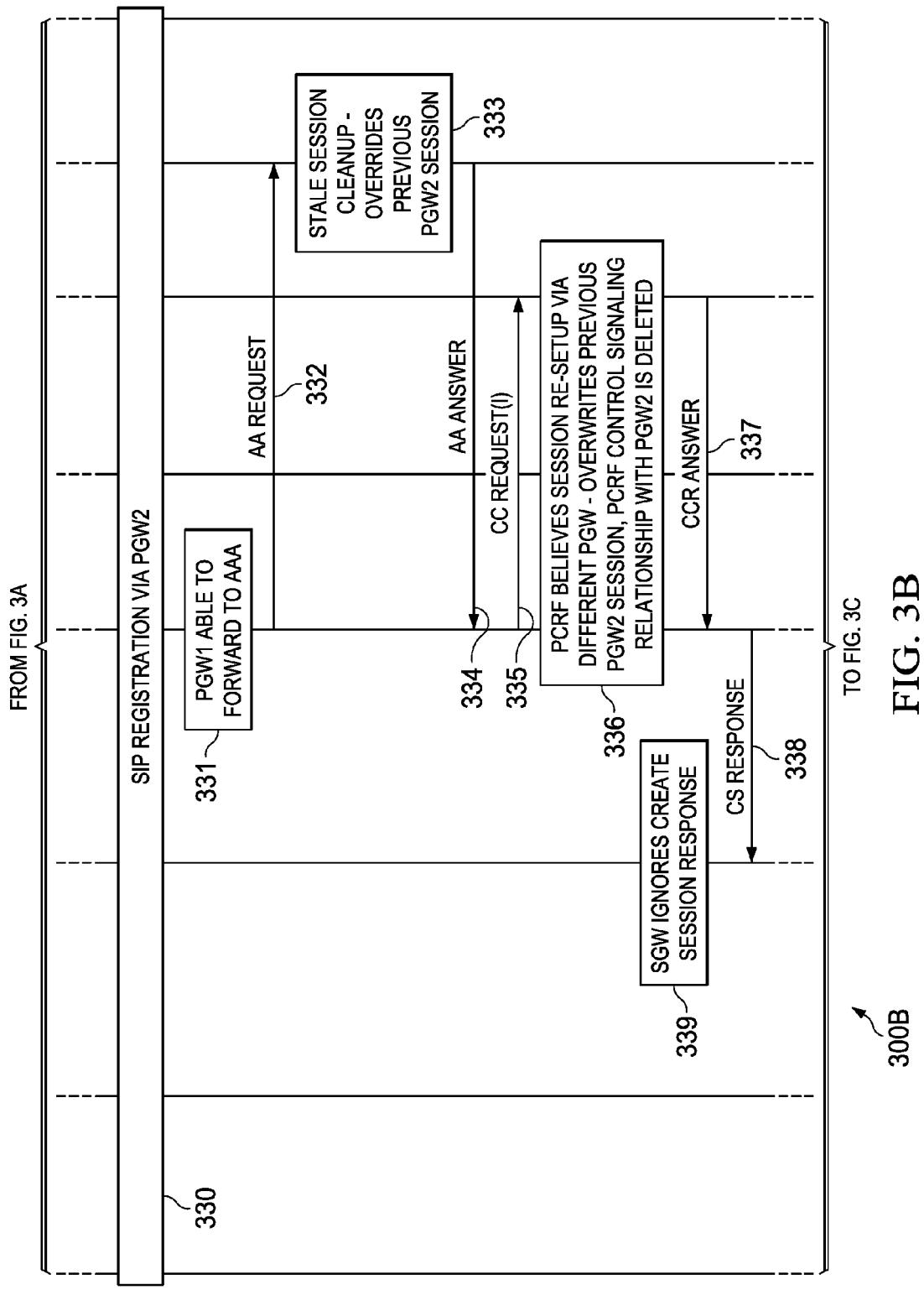
Figure 3C:
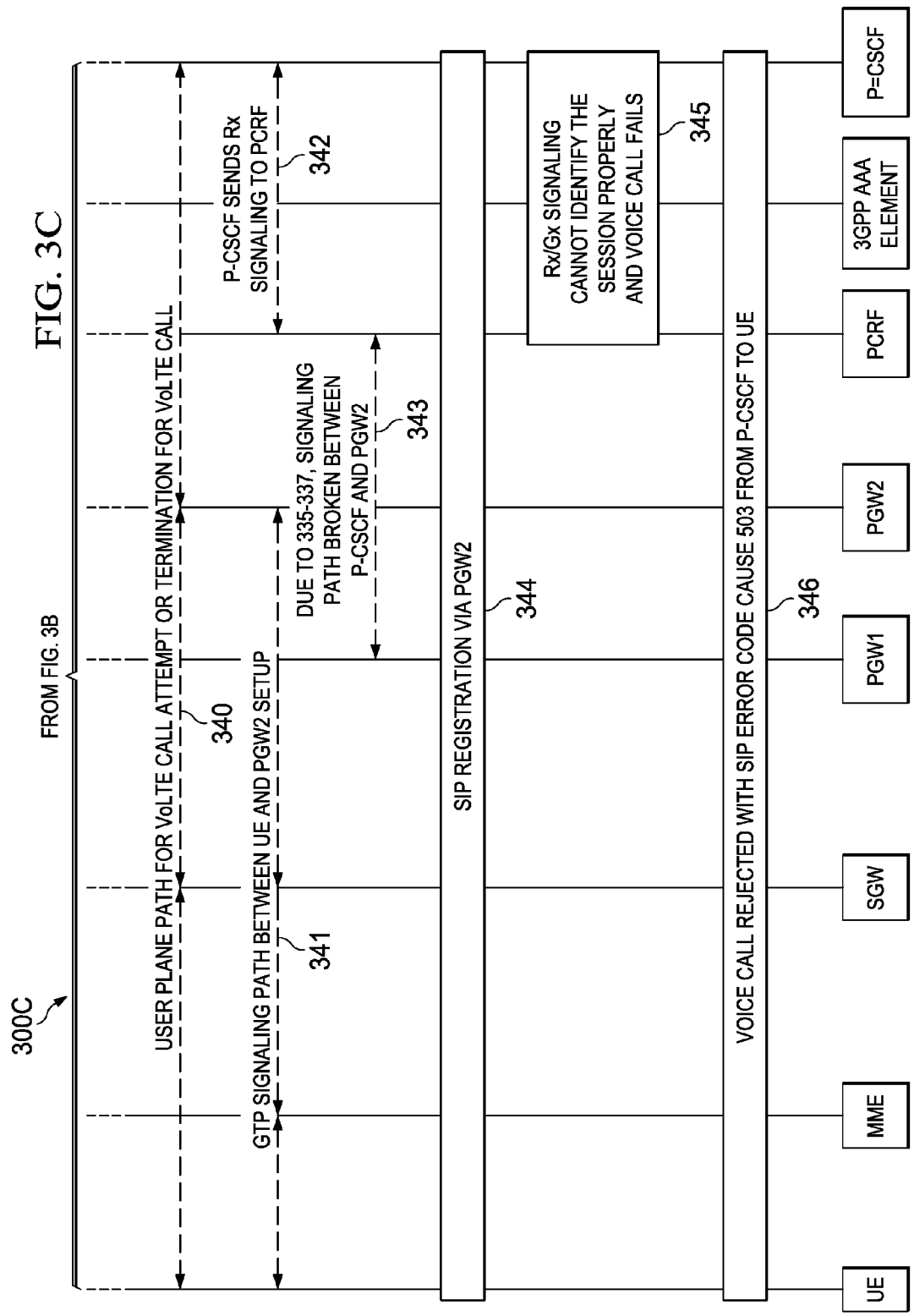

In order to further detail the appropriate operations to achieve the teachings of the present disclosure, reference is now made to FIGS. 3A-3C. FIGS. 3A-3C are simplified flow diagrams 300A-300C illustrating example activities associated with creating a VoLTE PDN for a UE. Such information is offered earnestly and for teaching purposes only and, therefore, should not be construed in a way to limit the broad applications for the present disclosure.

The following call flows and activities described in FIGS. 3A-3C illustrate a scenario where creating a VoLTE PDN gets delayed at PGW1 (e.g., PGW 14), which results in invalid Stray Session handling at the 3GPP AAA element and the PCRF. To understand the impact due to node selection fall back to secondary peer (e.g., PGW2), consider a case where a PDN Create Session Request is received at PGW1 from various RAT or interfaces (e.g., GERAN, UTRAN, E-UTRAN and/or WLAN). Thus, PGW1 may need to interact with various other nodes (e.g., PCRF, 3GPP AAA element, OCS, etc.) before responding back with create session response, which can create a delay in the PGW1 create session response. There are the various possible scenarios for delays in processing a create session request at a PGW, which may include, but not be limited to: PGW processing delay, PCRF processing delay, 3GPP AAA element processing delay, SDM and/or Sh interface delay, OCS processing delay (non-IMS), backpressure queues congestion, transport delay, combinations thereof or the like.

As illustrated in flow diagram 300A shown in FIG. 3A, a device (e.g., a UE) may communicate an Attach-Request (e.g., PDN connectivity request) for an IMS PDN at flow 302. At 304, the MME may communicate a create session (CS) request to the SGW. At 306a, the SGW may communicate the CS request to PGW1 and at 305 may, for example, start a two (2) second response timer for a CS response to arrive from PGW1. In the present example, PGW1 takes more than two seconds to process the CS Request. At 306b, the SGW may retransmit the CS request to PGW1, however, at 308, SGW's response timer may fire and the SGW may send a CS response back to the MME with a cause code 100 (e.g., remote peer not responding).

At 310, the MME may select a new PGW and may resend the CS request to the same SGW, which may route the request to PGW2 at 312. PGW2 may process the CS request in a normal manner. For example, PGW2 may communicate an AA request (AAR) to the 3GPP AAA element at 314. The AAA element may process the request and reply with an AA Answer to PGW2 at 316. At 318, PGW2 may communicate a credit control (CC) request to the PCRF. At 320, the PCRF may communicate a CC request (CCR) answer to PGW2. At 322, PGW2 may communicate a CS response back to the SGW. At 324, the SGW communicates a CS response back to the MME. At 326, the MME communicates an attach request (PDN connectivity request) response to the UE to complete. At 327, the transaction is further processed and a PDN may be established (e.g., a user plane path) between the UE and the P-CSCF. The user plane path may include the SGW and PGW2 between the UE and the P-CSCF. At 328, a signaling path may be setup and may include the MME, SGW, PGW2 and PCRF between the UE and the P-CSCF.

The flows and activities continue to flow diagram 300B as shown in FIG. 3B. SIP registration may occur for the UE via PGW2, as shown at 330. Recall, however, that the original CS request is still processing on PGW1 and is eventually processed at 331, where PGW1 is able to forward the CS request to the 3GPP AAA element. At 332, PGW1 may communicate an AA request to the 3GPP AAA element. The original CS request for the PGW1 transaction now becomes the last update in the 3GPP AAA element. At 333, the AAA element is not able to identify this as a stray request but rather identifies the session for PGW2 as a stale session and performs a stale session cleanup, thus overriding the session. At 334, the 3GPP AAA element communicates an AA answer to PGW1. A similar exchange occurs between PGW1 and the PCRF at 335, 336 and 337 for a CCR(I) and CCR-Answer. Particularly, at 336 the PCRF believes that the CS request is a session re-setup via a different PGW and thus overwrites the PGW2 session for the UE; thereby the PCRF control signaling relationship is deleted. At 338, PGW1 communicates a CS response to the SGW, however, the SGW ignores the create session response at 339, as the SGW does not have context for the session. The flows and activities continue to flow diagram 300C as shown in FIG. 3C.

Thus, when a user attempts a VoLTE call or receives termination for a VoLTE call at 340, the SIP signaling is communicated successfully between the UE and the P-CSCF. At 341, a GTP signaling path between the UE and PGW2 is setup. At 342, the P-CSCF will send Rx signaling to the PCRF. However, since the PCRF now has a relationship with PGW1 (e.g., due to steps 335-337, above), the signaling path between the P-CSCF and PGW2 is broken at 343 and instead includes PGW1. The PCRF may send a re-authorization request (RAR) to PGW1, however, dedicated bearer setup fails as PGW1 is not the correct PGW for the setup. At 344, SIP registration may occur via PGW2; however, as Rx/Gx signaling cannot identify the session properly for the UE, the voice call fails at 345. At 346, the voice call may be rejected with SIP error cause code 503 from the P-CSCF to the UE. The user/UE may stay in this condition until reboot.

Figure 4:
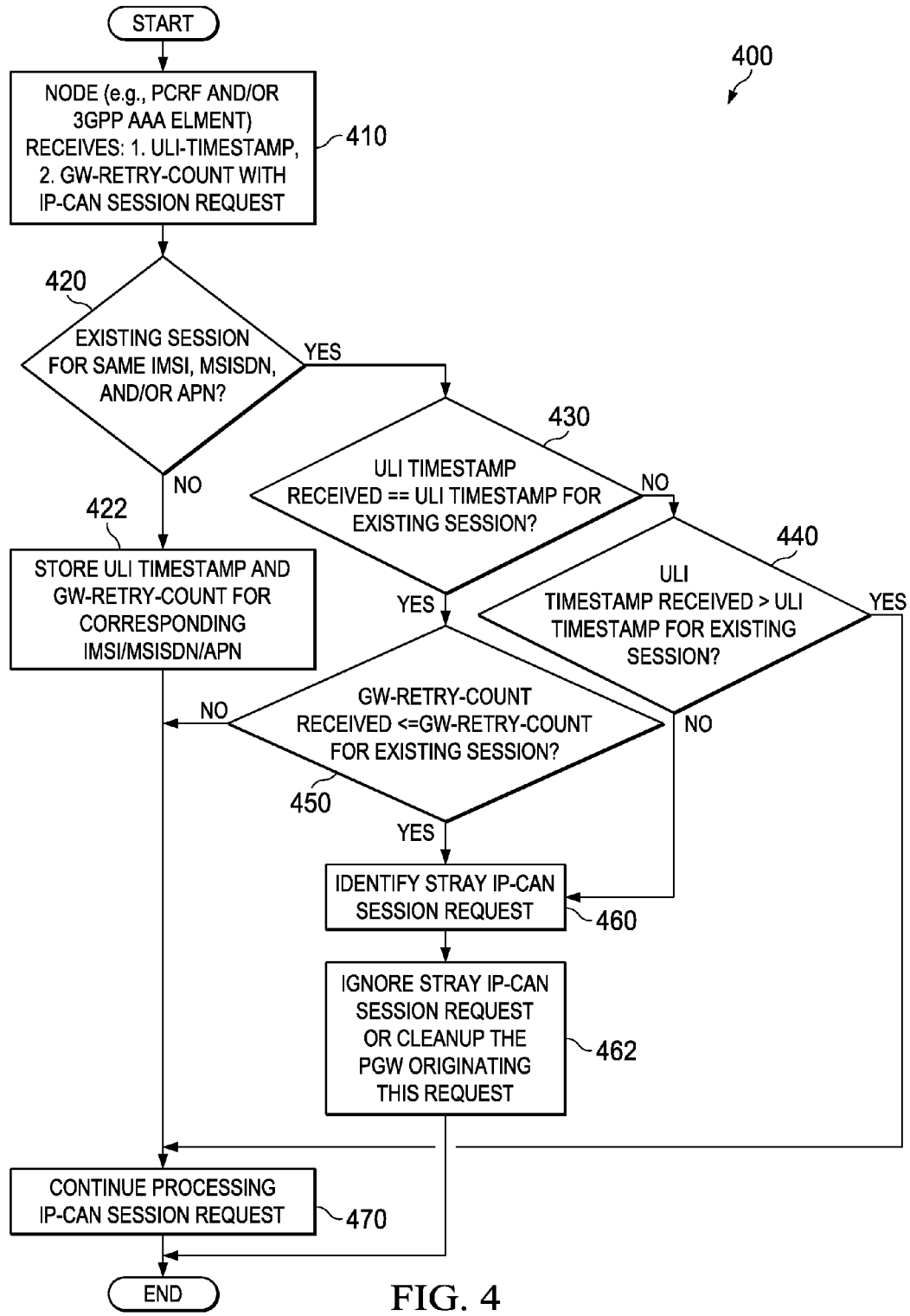
FIG. 4 is a simplified flow diagram illustrating example operations associated with identifying and handling stray session requests in accordance with one potential embodiment of the communication system.

Turning to FIG. 4, FIG. 4 is a simplified flow diagram 400 illustrating example operations associated with identifying and handling stray session requests in one example embodiment of communication system 10. In one example embodiment, these operations may be carried out using MME 40, including session management module 44c; SGW 28; PGW 14 (e.g., PGW1) and/or PGW 16 (e.g., PGW2); 3GPP AAA element 24, including session management module 44a; and PCRF 36, including session management module 44b. The operations as described below may provide a heuristic algorithm/process for stray session identification and handling.

Processing may begin when a particular UE (e.g., UE 12a) seeks to initiate a PDN IP-CAN session with IMS 60, as shown in FIG. 1. Thus, processing may start at 410 when a node (e.g., PCRF 36 and/or 3GPP AAA element 24) receives a ULI timestamp and a GW-retry-count value with an IP-CAN session request message for the UE. At 420, the node may determine whether an existing session exists for the IMSI, MSISDN and/or APN for the user associated with the UE. If a session does not exist, the node may store the ULI timestamp and GW-retry-count for the IMSI, MSISDN and/or APN for the user/UE at 422 and may continue to process the IP-CAN session request for the UE at 470.

If, however, the node determines that a session does exist for the IMSI, MSISDN, and/or APN at 420, then the node may determine if the ULI timestamp received for the UE is equal to the ULI timestamp stored for the existing session for the UE at 430. If the ULI timestamp received is equal to the ULI timestamp stored for the existing session, then the node may determine if the GW-retry-count received is less than or equal to the GW-retry-count stored for the existing session at 450. If the GW-retry-count received is less than or equal to the GW-retry-count stored for the existing session for the same IMSI, MSISDN and/or APN, the node may identify the request as a stray IP-CAN session request at 460 and may ignore the request and/or clean-up the PGW from which the request originated at 462. Otherwise if, at 450, the GW-retry-count received is not less than or equal to the GW-retry-count stored for the existing session, then the node may continue to process the IP-CAN session request at 470.

Recalling 430, if the ULI timestamp received is not equal to the ULI timestamp stored for the existing session then the node may determine at 440 whether the ULI timestamp received is greater than the ULI timestamp stored for the existing session. If so, the node may continue to process the IP-CAN session request at 470. If not, the node may identify the request as a stray IP-CAN session request at 460 and may ignore the request and/or clean-up the PGW from which the request originated at 462.

Figure 5B:
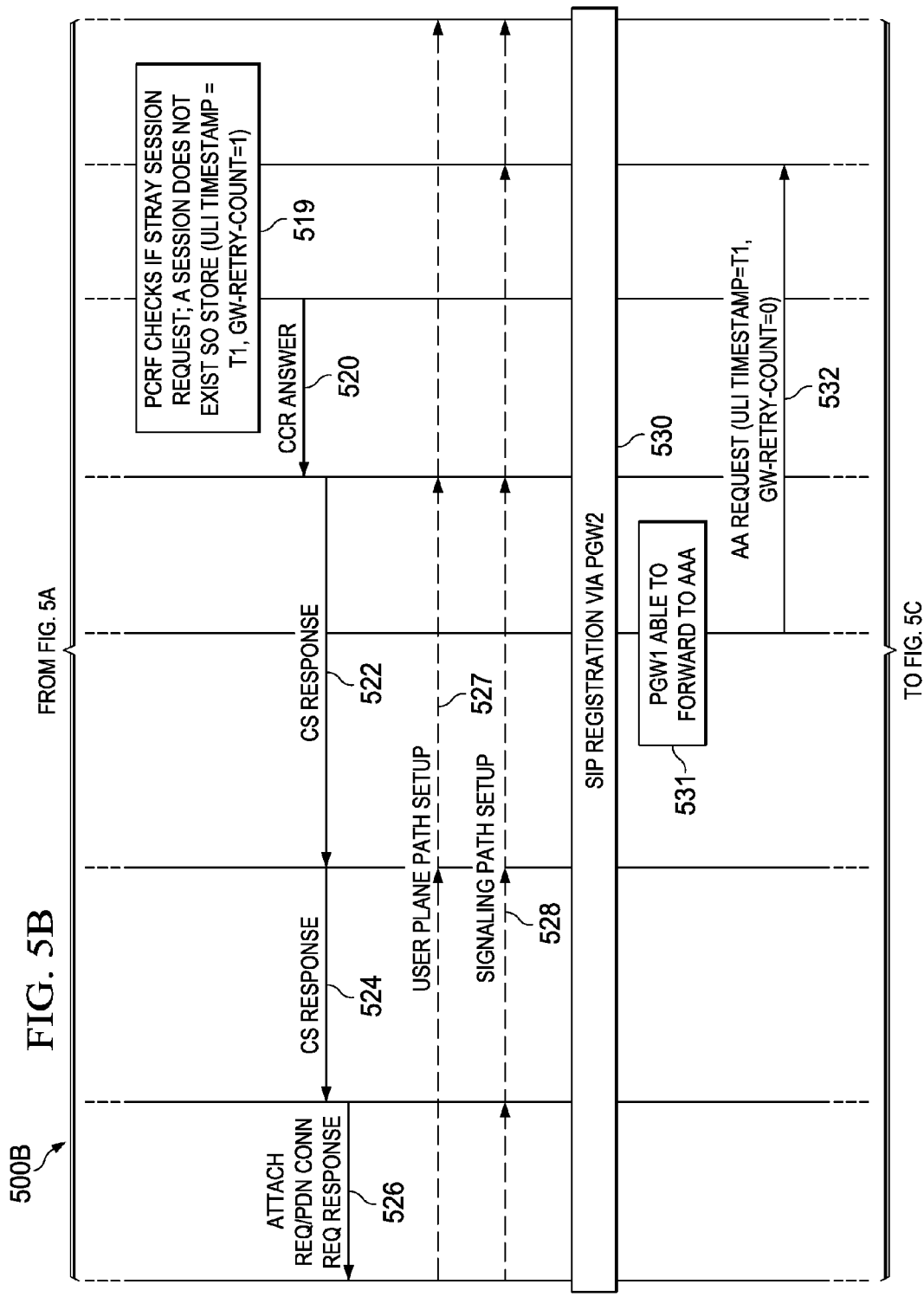
Figure 5C:
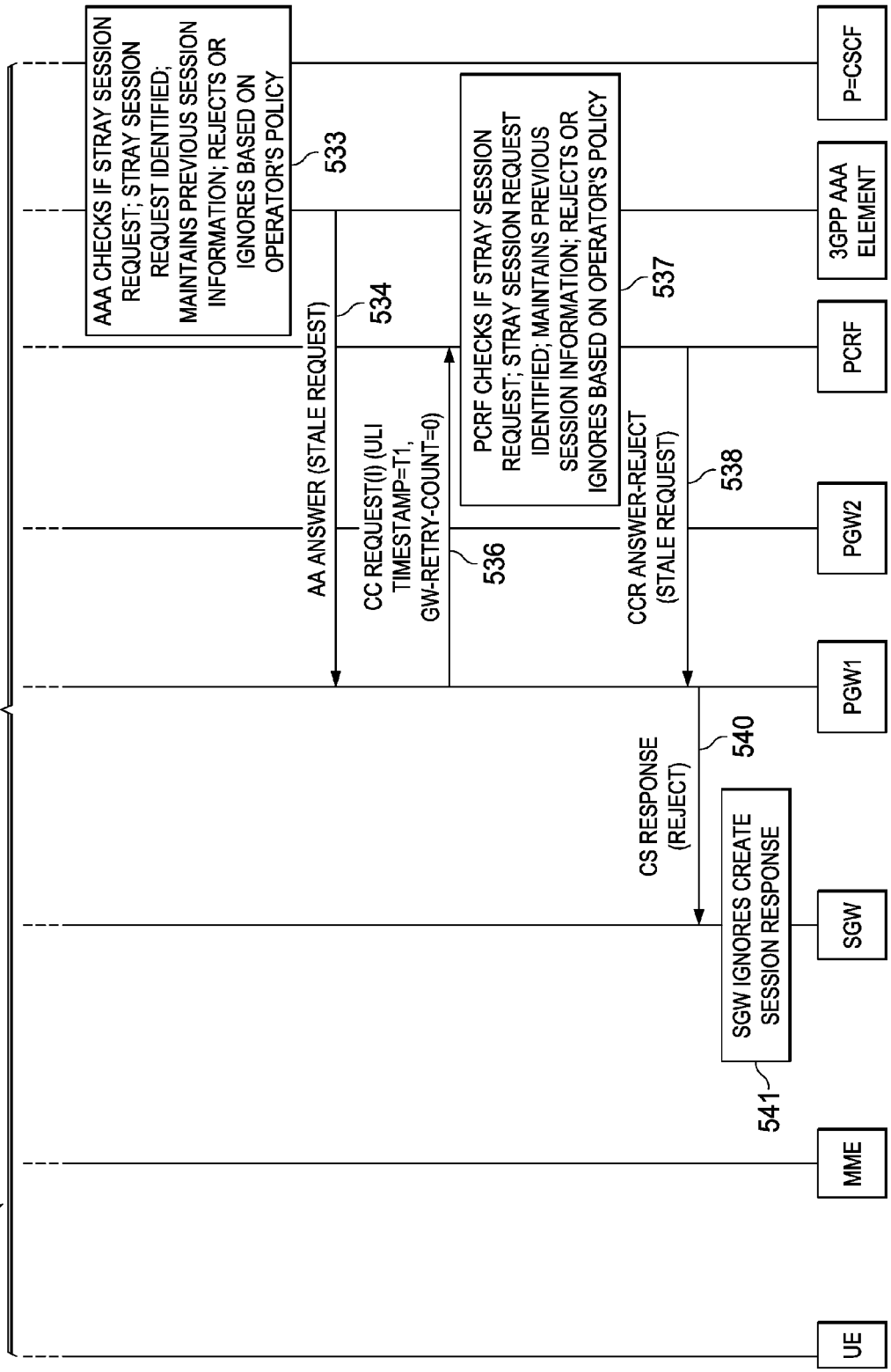

Turning to FIGS. 5A-5C, FIGS. 5A-5C are simplified flow diagrams 500A-500C illustrating potential flows and activities associated with the handling stray session requests in accordance with one potential embodiment of communication system 10. In one example embodiment, these operations may be carried out using MME 40, including session management module 44c; SGW 28; PGW 14 (e.g., PGW1) and/or PGW 16 (e.g., PGW2); 3GPP AAA element 24, including session management module 44a; PCRF 36, including session management module 44b; and P-CSCF 62. More particularly, the MME may include the new IE GW-retry-count and ULI-timestamp in create session requests originating from the MME (e.g., using session management module 44c). The MME may increase GW-retry-count for every retry to a new PGW, unless the UE has transitioned to the MME from another MME, at which point, the MME may restart the GW-retry-count from zero (0).

As illustrated in flow diagram 500A shown in FIG. 5A, the flows and activities may begin at 502 where a given UE (e.g., UE 12a) may communicate an Attach-Request (PDN connectivity request) for an IMS PDN. At 504, the MME (e.g., MME 40) may communicate a create session (CS) request to the SGW (e.g., SGW 28) including a ULI timestamp=T1 and a GW-retry-count=0 for the UE. At 506a, the SGW may communicate the CS request including the ULI timestamp=T1 and a GW-retry-count=0 to PGW1 (e.g., PGW 14). At 505 the SGW may, for example, start a two (2) second response timer to wait for a CS response to arrive from PGW1. In the present example, it is assumed that PGW1 takes more than two seconds to process the CS Request. At 506b, the SGW may retransmit the CS request (again including ULI timestamp=T1 and a GW-retry-count=0) to PGW1, however, at 508, SGW's response timer may fire and the SGW may send a CS response back to the MME with a cause code 100 (e.g., remote peer not responding).

At 510, the MME may select a new PGW (e.g., PGW2 (PGW 16)) and may send another CS request to the same SGW, this time including a ULI timestamp=T1 and a GW-retry-count=1 with the CS request. The SGW may route the request to PGW2 at 512, including the ULI timestamp=T1 and a GW-retry-count=1. PGW2 may process the CS request in a normal manner. For example, at 514, PGW2 may communicate an AA request (AAR) including the ULI timestamp=T1 and a GW-retry-count=0 to the 3GPP AAA element (e.g., 3GPP AAA element 24). At 515, the 3GPP AAA element may determine if the session request is a stray session request (e.g., using operations as described herein such as, for example, determining if a session exists, comparing GW-retry-count, ULI timestamp, etc.) and may determine that the request is not a stray session request (e.g., a session does not exist); thus the 3GPP AAA element may store ULI timestamp=T1 and a GW-retry-count=1 in association with the IMSI, MSISDN and/or APN for the user/UE. At 516, the 3GPP AAA element may reply to PGW2 with an AA Answer.

At 518, PGW2 may communicate a CCR(I) to the PCRF (e.g., PCRF 36) including the ULI timestamp=T1 and a GW-retry-count=1. The flows and activities may continue to flow diagram 500B as shown in FIG. 5B. At 519, the PCRF may determine if the session request is a stray session request (e.g., using operations as described herein such as, for example, determining if a session exists, comparing GW-retry-count, ULI timestamp, etc.) and may determine that the request is not a stray session request (e.g., a session does not exist); thus, the PCRF may store ULI timestamp=T1 and a GW-retry-count=1. At 520, the PCRF may respond to PGW2 with a CCR Answer. At 522, PGW2 may communicate a CS response back to the SGW. At 524, the SGW communicates a CS response back to the MME. At 526, the MME communicates an attach request (PDN connectivity request) response to the UE to complete attachment. At 527, the transaction is further processed and a PDN (e.g., a user plane path) may be established between the UE and the P-CSCF (e.g., P-CSCF 62). The user plane path may include the SGW and PGW2 between the UE and the P-CSCF. At 528, a signaling path may be setup and may include the MME, SGW, PGW2 and PCRF between the UE and the P-CSCF. SIP registration may occur for the UE via PGW2, as shown at 530.

Recall, however, that the original CS request is still processing on PGW1 and can eventually be processed at 531, where PGW1 is able to forward the session request to the 3GPP AAA element. As shown at 532, PGW1 may communicate an AA request to the 3GPP AAA element including ULI timestamp=T1 and GW-retry-count=0 (i.e., the ULI timestamp and GW-retry-count it received at 506a/506b, above). The flows and activities may continue to flow diagram 500C as shown in FIG. 5C. At 533, the 3GPP AAA element (e.g., 3GPP AAA element 24) may, among other things, determine if the session request is a stray request. [Recall, that the 3GPP AAA element as described in FIG. 3B, was not able to determine if the request was a stray request and merely overrode the existing session information for the PGW2 session.] Using the solution described herein, the 3GPP AAA element may now compare ULI timestamp=T1 and the GW-retry-count=0 received in the session request from PGW1 to the ULI timestamp=T1 and the GW-retry-count=1 stored for the existing session for the UE created via PGW2. Based on the comparison, the 3GPP AAA element may determine that the session request received from PGW1 is a stray session request (e.g., ULI timestamp received is equal to ULI timestamp stored for the session for the UE created via PGW2 and GW-retry-count received is less than GW-retry count stored for the session for the UE created via PGW2). Thus, the 3GPP AAA element may maintain the previously stored session information for the UE.

The 3GPP AAA element may reject or ignore the stray session request based on an operator's policy for handling identified stray session requests. For example, the 3GPP AAA element may communicate an AA Answer to PGW1 at 534 indicating that the request is a stale request. In some embodiments, the 3GPP AAA element can cause a cleanup of PGW1.

At 536, PGW1 may communicate a CCR(I) including ULI timestamp=T1 and GW-retry-count=0 to the PCRF (e.g., PCRF 36). At 537, the PCRF may, among other things, determine if the session request is a stray request. [Recall, that the PCRF as described in FIG. 3B, was not able to determine if the request was a stray request and merely overwrote the existing session information for the PGW2 session.] Using the solution described herein, the PCRF may now compare ULI timestamp=T1 and the GW-retry-count=0 received in the session request from PGW1 to the ULI timestamp=T1 and the GW-retry-count=1 stored for the existing session created via PGW2. Based on the comparison, the PCRF may determine that the session request received from PGW1 is a stray session request (e.g., ULI timestamp received is equal to ULI timestamp stored for the session for the UE created via PGW2 and GW-retry-count received is less than GW-retry count stored for the session for the UE created via PGW2). Thus, the PCRF may maintain the previously stored (PGW2) session information for the UE.

The PCRF may reject or ignore the stray session request based on an operator's policy for handling identified stray session requests. For example, the PCRF may communicate a CCR Answer rejection to PGW1 at 538 indicating that the request is a stale request. At 540, PGW1 may communicate a CS response to the SGW indicating the rejection. In some embodiments, the PCRF can cause a cleanup of PGW1. At 541, the SGW may ignore the create session response as it may not have context for the session.

Thus, when a user using the UE attempts a VoLTE call or receives termination for a VoLTE call, the SIP can pass through and dedicated bearer setup may successfully complete for the user's UE. As Rx/Gx signaling can now properly identify the session for the UE, voice calls may be completed for the user/UE.

Although several examples discussed herein in this Specification refer to an IP-CAN session request received at the PCRF and/or 3GPP AAA element as illustrative examples, it should be noted that the solution provided by communication system 10 can be extended to other use cases such as, for example, an MME selecting an alternate HSS or DIAMETER Routing Agent (DRA); a PGW selecting an alternate 3GPP AAA element, PCRF, Online Charging System (OCS), Offline Charging System (OFCS), etc.; a 3GPP AAA element selecting an alternate SDM element; a DRA selecting an alternate 3GPP AAA element, etc.; a given UE falling back to an evolved High Rate Packet Data (eHRPD) element and initiating a new session; a given UE falling back to a wireless local access network (WLAN), etc. and initiating a new session.

Figure 6:
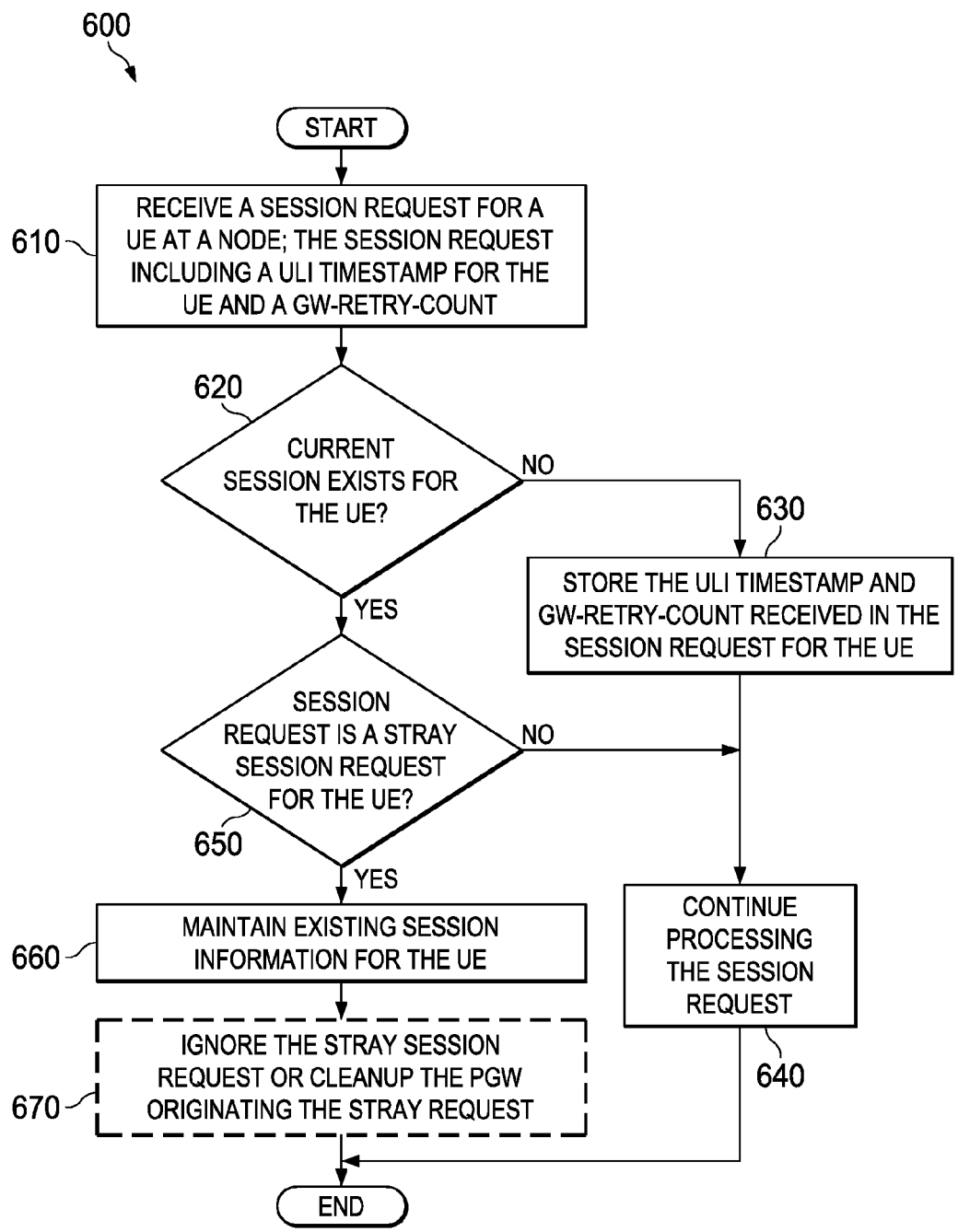
FIG. 6 is a simplified flow diagram illustrating other example operations associated with identifying and handling stray session requests in accordance with one potential embodiment of the communication system

Turning to FIG. 6, FIG. 6 is a simplified flow diagram 600 illustrating example operations associated with identifying and handling stray session requests in one example embodiment of communication system 10. In one example embodiment, these operations may be carried out using MME 40, including session management module 44c; SGW 28; PGW 14 (e.g., PGW1) and/or PGW 16 (e.g., PGW2); 3GPP AAA element 24, including session management module 44a; and PCRF 36, including session management module 44b.

Processing may begin when a particular UE (e.g., UE 12a) seeks to initiate a PDN IP-CAN session with IMS 60, as shown in FIG. 1. Thus, processing may start at 610 when a node (e.g., PCRF 36 and/or 3GPP AAA element 24) receives a ULI timestamp and a GW-retry-count value with an IP-CAN session request message for the UE. At 620, the node can determine whether a current session exists for the UE. For example, the node can compare a received IMSI, MSISDN, and/or APN for the session request with existing IMSIs, MSISDNs, and/or APNs for existing sessions stored in the node. If a current session does not exist, the node can store the ULI timestamp and GW-retry-count value received in the session request for the UE at 630. At 640, the node can continue processing the session request for the UE.

Recalling to 620, if a current session does exist, the node can determine whether the session request is a stray session request for the UE at 650. For example, the node can compare the received ULI timestamp and/or GW-retry-count for the UE with a stored ULI timestamp and/or GW-retry count for the UE to determine whether the session request is a stray session request. If not, the node can continue to process the session request for the UE at 640. If the node determines that the session request is a stray session request at 650, then the node can maintain existing session information for the UE at 660. At 670, the node can further ignore the stray session request or cleanup the PGW originating the stray session request in various embodiments.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a session request for a user equipment (UE) at a node, wherein the session request includes a timestamp for the UE and a retry count;
   determining whether the session request is a stray session request based on the timestamp and the retry count;
   maintaining session information for an existing session for the UE at the node when the session request is a stray session request; and
   sending, to a packet data network gateway (PGW), an indication that the session request was a stray session request, which initiates cleanup of context information for the UE at the PGW.

2. The method of claim 1, wherein the session request is an Internet Protocol connectivity access network (IP-CAN) create session request.

3. The method of claim 1, wherein the node is at least one of:
   a Policy and Charging Rules Function (PCRF); and
   an Authentication, Authorization and Accounting (AAA) element.

4. The method of claim 1, wherein the timestamp is a User Location Information (ULI) timestamp.

5. The method of claim 1, further comprising:
   determining if a current session exists for the UE; and
   storing the timestamp and retry count received for the UE if a session does not exist for the UE.

6. The method of claim 1, wherein the determining whether the received session request is a stray session request further comprises:
   comparing a timestamp stored for the existing session for the UE to the timestamp received in the session request; and
   identifying the received session request as a stray request if the timestamp received in the session request is less than the timestamp stored for the existing session for the UE.

7. The method of claim 6, wherein the determining whether the received session request is a stray session request further comprises:
   comparing a retry count stored for the existing session for the UE to the retry count received in the session request if the timestamp received in the session request is equal to the timestamp stored for the existing session for the UE; and
   identifying the received session request as a stray session request if the retry count received in the session request is less than or equal to the retry count stored for the existing session for the UE.

8. One or more non-transitory tangible media encoding logic that includes instructions for execution that when executed by a processor, is operable to perform operations comprising:
   receiving a session request for a user equipment (UE) at a node, wherein the session request includes a timestamp for the UE and a retry count;
   determining whether the session request is a stray session request based on the timestamp and the retry count;
   maintaining session information for an existing session for the UE at the node when the session request is a stray session request; and
   sending, to a packet data network gateway (PGW), an indication that the session request was a stray session request, which initiates cleanup of context information for the UE at the PGW.

9. The media of claim 8, wherein the session request is an Internet Protocol connectivity access network (IP-CAN) create session request.

10. The media of claim 8, wherein the node is at least one of:
    a Policy and Charging Rules Function (PCRF); and
    an Authentication, Authorization and Accounting (AAA) element.

11. The media of claim 8, wherein the timestamp is a User Location Information (ULI) timestamp.

12. The media of claim 8, the operations further comprising:
    determining if a current session exists for the UE; and
    storing the timestamp and retry count received for the UE if a current session does not exist for the UE.

13. The media of claim 8, wherein the determining whether the received session request is a stray session request further comprises:
    comparing a timestamp stored for the existing session for the UE to the timestamp received in the session request; and
    identifying the received session request as a stray request if the timestamp received in the session request is less than the timestamp stored for the existing session for the UE.

14. The media of claim 13, wherein the determining whether the received session request is a stray session request further comprises:
- comparing a retry count stored for the existing session for the UE to the retry count received in the session request if the timestamp received in the session request is equal to the timestamp stored for the existing session for the UE; and
- identifying the received session request as a stray session request if the retry count received in the session request is less than or equal to the retry count stored for the existing session for the UE.

15. A system, comprising:
- a memory element for storing data; and
- a processor to execute instructions associated with the data that, when executed, the system is configured to:
- receive a session request for a user equipment (UE) at a node, wherein the session request includes a timestamp for the UE and a retry count;
- determine whether the session request is a stray session request based on the timestamp and the retry count;
- maintain session information for an existing session for the UE at the node if the session request is a stray session request; and
- send, to a packet data network gateway (PGW), an indication that the session request was a stray session request, which initiates cleanup of context information for the UE at the PGW.

16. The system of claim 15, wherein the session request is an Internet Protocol connectivity access network (IP-CAN) create session request.

17. The system of claim 15, wherein the node is at least one of:
- a Policy and Charging Rules Function (PCRF); and
- an Authentication, Authorization and Accounting (AAA) element.

18. The system of claim 15, wherein the timestamp is a User Location Information (ULI) timestamp.

19. The system of claim 15, wherein the system is further configured to:
- determine if a current session exists for the UE; and
- store the timestamp and retry count received for the UE if a session does not exist for the UE.

20. The system of claim 15, wherein the indication is sent from the node that received the session request.

* * * * *

UNITED STATES PATENT AND TRADEMARK OFFICE
CERTIFICATE OF CORRECTION

| | | |
|---|---|---|
| PATENT NO. | : 9,936,438 B2 | Page 1 of 1 |
| APPLICATION NO. | : 15/202161 | |
| DATED | : April 3, 2018 | |
| INVENTOR(S) | : Paras Jain et al. | |

It is certified that error appears in the above-identified patent and that said Letters Patent is hereby corrected as shown below:

On the Title Page

Item (73), in Column 1, in "Assignee", Line 1, delete "Technologies," and insert -- Technology, --, therefor.

In the Drawings

On sheet 6 of 10, in Figure 4, reference numeral 410, Line 2, delete "ELMENT)" and insert -- ELEMENT) --, therefor.

In the Specification

In Column 3, Line 63, delete "multiplex" and insert -- multiple --, therefor.

In Column 9, Line 44, delete "'and" and insert -- and --, therefor.

Signed and Sealed this
Second Day of October, 2018

Andrei Iancu
*Director of the United States Patent and Trademark Office*